United States Patent Office.

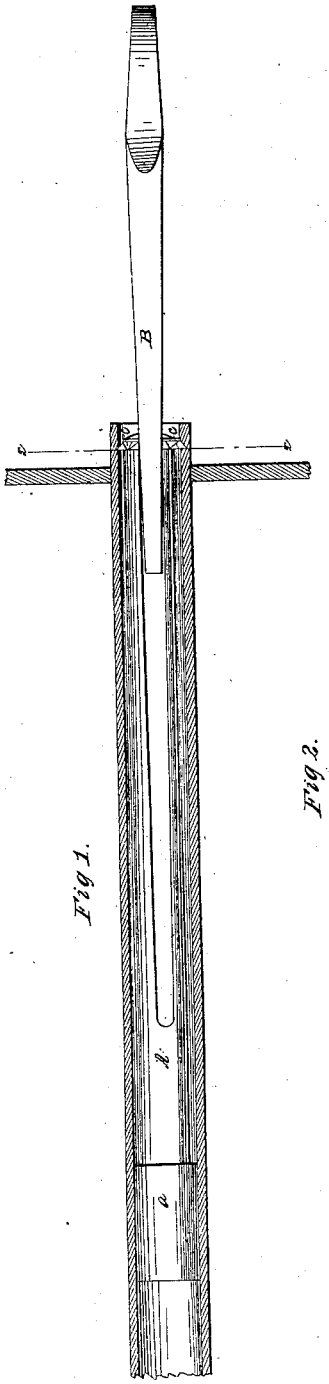

PETER HOFFMAN, OF JERSEY CITY, NEW JERSEY.

Letters Patent No. 63,250, dated March 26, 1867.

---

IMPROVED TOOL FOR CUTTING OFF BOILER TUBES.

---

*The Schedule referred to in these Letters Patent and making part of the same.*

---

TO ALL WHOM IT MAY CONCERN:

Be it known that I, PETER HOFFMAN, of Jersey City, in the county of Hudson, and State of New Jersey, have invented a new and improved Tool for Cutting Boiler Tubes; and I do hereby declare that the following is a full, clear, and exact description thereof, which will enable others skilled in the art to make and use the same, reference being had to the accompanying drawings forming part of this specification, in which—

Figure 1 represents a longitudinal central section of this invention.

Figure 2 is a transverse section of the same, taken in the plane indicated by the line $x\ x$, fig. 1.

Similar letters of reference indicate like parts.

This invention relates to a tool for cutting boiler tubes, which is composed of a split or sectional bar, one end of which is made to fit the tube to be cut, while the other end, which carries the cutter, is open to receive a wedge in such a manner that when the cutter bar is inserted in the tube to be cut, and the wedge is placed in its slotted end, the points or teeth of the cutter catch in the inner surface of the tube, and by turning the wedge and cutter bar and driving said wedge in gradually the tube is cut in a short time and without producing the least jar on the joints of the boiler.

A represents a bar, made of steel or any other suitable material. One end of this bar is provided with a boss, $a$, just thick enough to fit the tube to be cut, and of any suitable length to steady the bar during the operation of cutting. From the boss extends the shank or body of the bar, the diameter of which is less than that of the bore of the tube, and on the outer end of this bar are formed the teeth $c$, or a suitable cutter may be secured to said bar. The body of the bar is provided with a long slot, $b$, which is capable of receiving the wedge B, so that by inserting this wedge the bar can be expanded. It must be remarked that the bar, instead of being slotted, might be made in two sections, of such a shape that they form a slot to admit the wedge at one end, and that they can be firmly united by a sleeve or screw thimble placed over their opposite ends, said sleeve or screw thimble being of such a thickness that it fits the tube to be cut. This arrangement I would consider a mechanical equivalent of the bar shown in the drawing. In order to cut a tube the bar A is inserted thereon, as shown in fig. 1 of the drawing, until the points of the cutter are opposite the spot where it is to take effect. By inserting the wedge B the points of the cutter are made to bite in the inner surface of the tube, and by turning the wedge with a ratchet-brace or wrench and tapping it at suitable intervals with a mallet or hammer, the operation of cutting the tube is effected. It is obvious that with my tool the tube can be cut at any desirable spot, though it is intended particularly for cutting off the ends of boiler tubes previous to securing the same in the tube sheet, an operation which, with the tools as now used, requires much time and labor.

What I claim as new, and desire to secure by Letters Patent, is—

A tool for cutting boiler tubes, which is composed of a split or sectional bar, A, provided at one end with a boss, $a$, and at the opposite end with teeth $c$, to operate in combination with a wedge, B, substantially as and for the purpose set forth.

The above specification of my invention signed by me this sixth day of November, 1866.

PETER HOFFMAN.

Witnesses:
W. HAUFF,
ALEX. F. ROBERTS.